Figure 3:
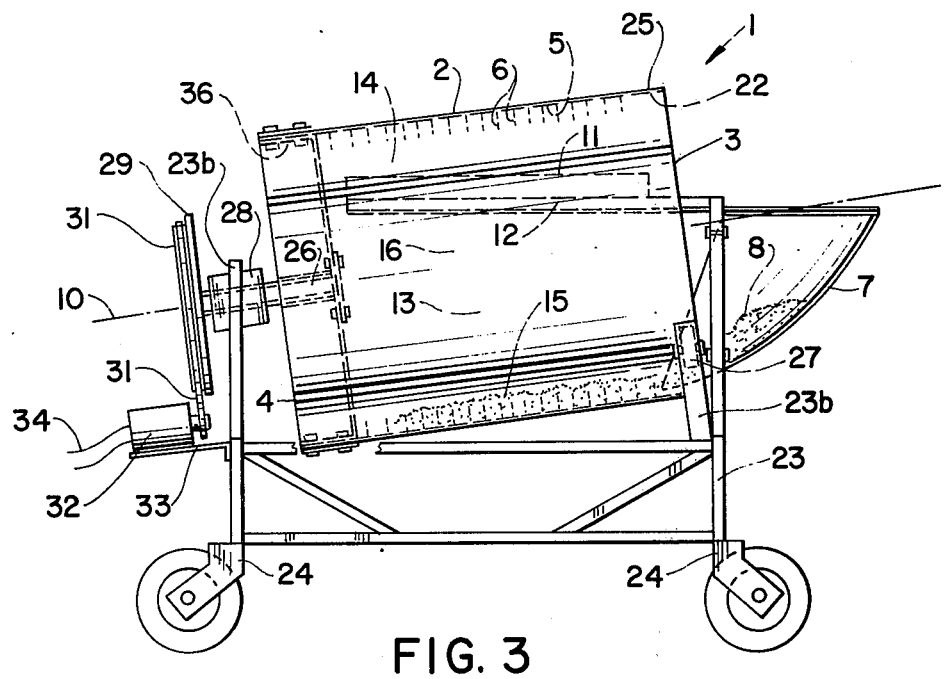

United States Patent [19]

Beal et al.

[11] 4,114,762

[45] Sep. 19, 1978

[54] WORM HARVESTING

[76] Inventors: Steven G. Beal; Arthur Ceballos; Dolores D. Ceballos, all of 508 Sonoma St., Carson City, Nev. 89701

[21] Appl. No.: 737,754

[22] Filed: Nov. 1, 1976

[51] Int. Cl.² .............................................. B07C 9/00
[52] U.S. Cl. ...................................................... 209/78
[58] Field of Search ........................... 209/76, 78, 95; 171/114, 122

[56] References Cited

U.S. PATENT DOCUMENTS

| 438,963 | 10/1890 | Tonsager | 171/122 |
|---|---|---|---|
| 639,117 | 12/1899 | Walker | 209/95 |
| 1,743,240 | 1/1930 | Ryder | 209/78 |
| 2,462,682 | 2/1949 | Schubert | 209/78 X |
| 2,769,539 | 11/1956 | Packman | 209/78 |

Primary Examiner—Joseph J. Rolla
Attorney, Agent, or Firm—Arthur A. March

[57] ABSTRACT

Worm harvesting apparatus and method for recovering worms from their accompanying habitat soil, utilizing worm gathering projections, on the interior of a drum rotatable about a substantially horizontal axis, to gather worms from accompanying soil disposed in the lower portion of the drum as such soil cascades upon itself during drum rotation and in turn to carry such worms to the upper portion of the drum for gravity release thereat from such projections to permit gravity deposition of the worms in a collecting receptacle disposed in the drum.

16 Claims, 5 Drawing Figures

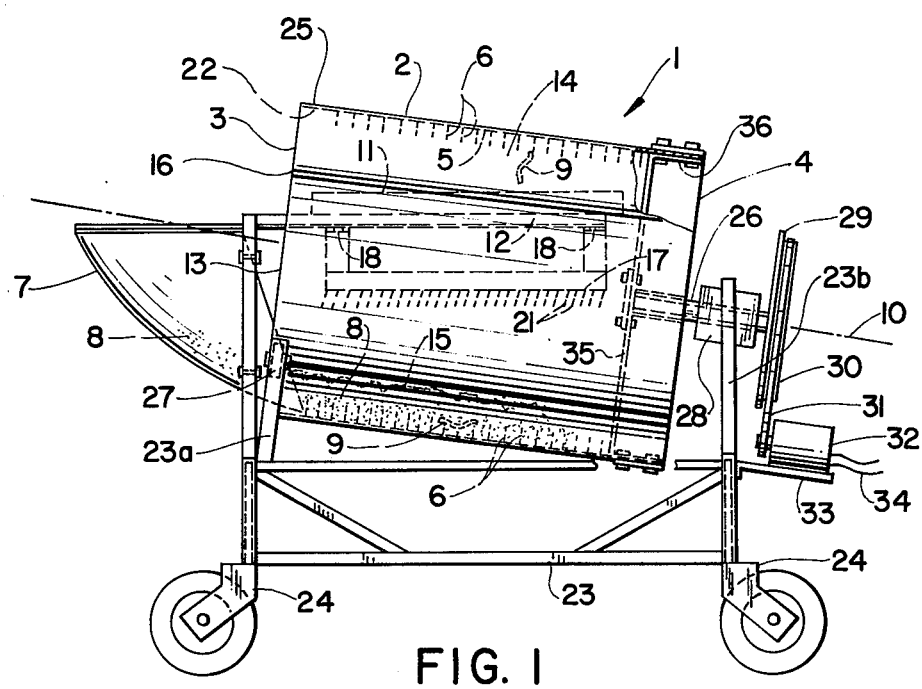
FIG. 1
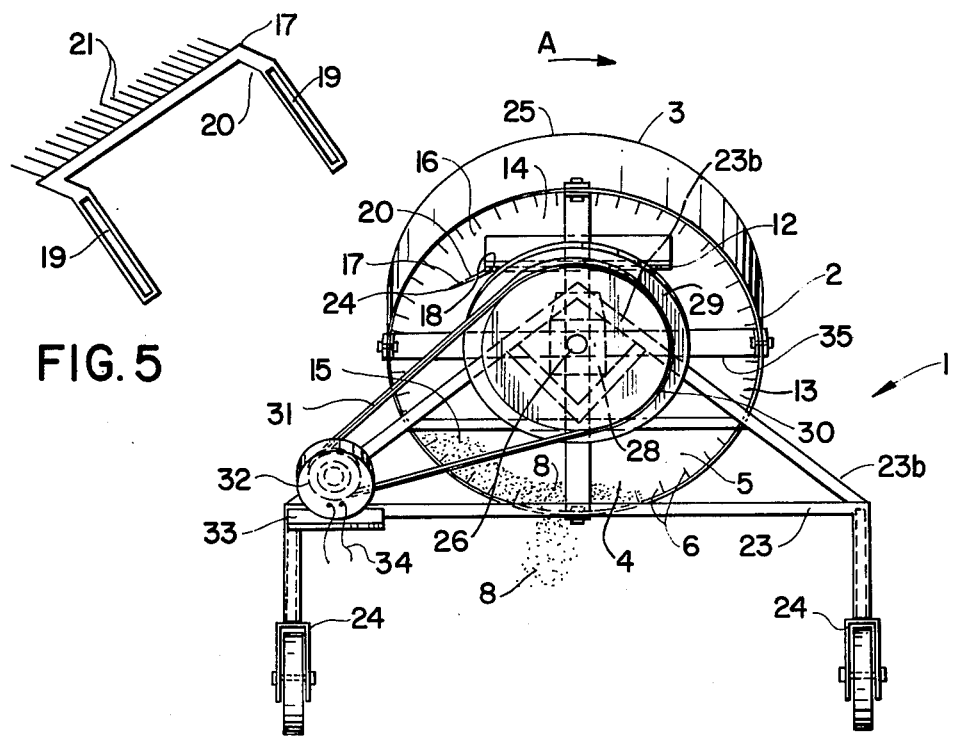
FIG. 5
FIG. 2

WORM HARVESTING

The present invention relates to worm harvesting and more particularly to an apparatus and a method for gently recovering worms from their accompanying habitat soil.

Worm production has been expanding recently to meet the significantly increasing demand for worms for such purposes as supplying the needs of commercial and sport bait fishing endeavors, research projects, and the like. Accordingly, worm raising or worm farming has reached high magnitude levels. Due to the nature of worms, they must be kept in a viable soil habitat until ready for use as otherwise they will soon die or lose their commercial value. When ready for use, the worms must be harvested from the environmental habitat soil in which they are raised or kept, for classification, distribution, marketing, etc.

All of such harvesting manipulations require relatively tedious attention in order to minimize undesired damaging or killing of the worms. This has become a major problem in the field of commercial worm production in view of the comparatively high orders of magnitude of the tonnage and volume of the soil, sand, dirt or other particulate or granular solids temporary or permanent habitat in which the worms must be kept and which must be processed in order to recover the worms. Up to now, the equipment used to harvest worms from attendant habitat soil has been comparatively rudimentary. As a result, slow and inefficient processing is all that can be expected, adding to the overall expense of worm production.

It may be noted for instance that U.S. Pat. No. 2,257,879 shows an arrangement utilizing a series of lifters for, in effect, scooping bait out of a box containing granular material in order that the bait may be manually removed therefrom. Furthermore, in the device shown in U.S. Pat. No. 2,573,202 bait which has migrated to the bottom of a box is lifted to the top in order that it may be easily removed. U.S. Pat. No. 2,642,836 merely discloses an arrangement serving as an incubator for fish bait.

It is an object of the present invention to overcome the foregoing prior art drawbacks and deficiencies and to provide an apparatus and method for harvesting worms, which involve simplicity, efficiency and economy, and which are usable with versatility for processing both high and low orders of magnitude tonnage and volume soil levels.

It is another object of the invention to provide a worm harvesting apparatus which is strong and safe in design, simple and inexpensive in construction, and durable and efficient in use, requiring a minimum of motive power and a minimum of attention by the operator.

It is still another object of the invention to provide an apparatus and method of the foregoing type in which the worms are readily gathered from attendant habitat soil and collected for recovery generally free from such soil in a manner assuring effective safety to the operator and to the worms, enabling even a single attendant to carry out the harvesting operation for gentle gathering and collection of the worms essentially without damaging or killing the worms.

It is a further object of the invention to provide such a method and apparatus in which the soil from which the worms are to be harvested or picked or separated may be fed to one end of a rotating horizontal drum or harvesting zone for automatic discharge from the other end thereof to permit correspondingly rotating projections in the drum or zone to gather worms from the soil as it cascades upon itself during rotation for gravity release of the worms from the projections and in turn collection by gravity deposition in a receptacle in the drum or zone during continued rotation.

Figure 4:
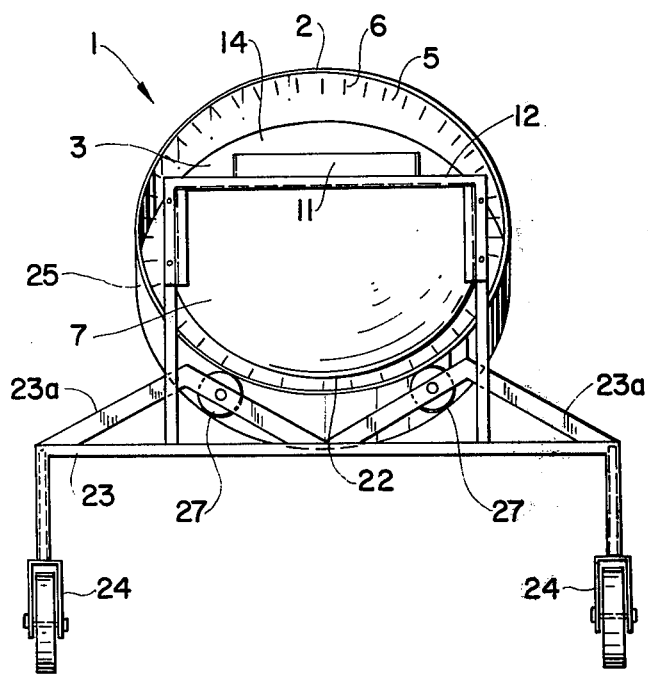

Other and further objects of the invention will become apparent from a study of the within specification and accompanying drawings, in which:

FIG. 1 is a schematic side view of one side of the worm harvesting apparatus according to an embodiment of the invention, FIG. 2 is a schematic end view of one end of the apparatus shown in FIG. 1, FIG. 3 is a schematic side view of the other side of the apparatus shown in FIG. 1, FIG. 4 is a schematic end view of the other end of the apparatus shown in FIG. 2, and FIG. 5 is a schematic perspective view of means for breaking up lumps of soil in the apparatus of FIG. 1.

According to the present invention, a worm harvesting apparatus and method are advantageously provided for recovering or separating worms form their accompanying habitat soil essentially without damaging or killing the worms. This may be accomplished for instance by cascading the soil upon itself in the lower portion of a rotating more or less horizontal drum or zone and gathering the worms therefrom by projections on the drum or zone interior, and in turn collecting the gathered worms by gravity deposition in a receptacle upon gravity release thereof from the projections as they reach the upper portion of the rotating drum or zone.

The rotary motion along a substantially horizontal axis to achieve cascading of the soil and gathering of the worms by the projections coupled with the gravity release and gravity deposition of the worms for collection, advantageously assure gentle handling of the worms. This is true despite the unit weight and volume of the soil throughout and the inherently heavy density of soil or other particulate or granular solids material habitat being processed.

Briefly, according to one aspect of the invention, the worm harvesting apparatus comprises a drum mounted for rotation about a substantially horizontal axis and having an interior surface provided with a plurality of worm gathering projections operatively distributed in spaced apart relation thereon. Usable therewith is a worm collecting receptacle operatively disposed in the drum and radially inwardly spaced from the worm gathering projections sufficiently to permit unhindered drum rotation relative thereto and gravity deposition thereinto of worms gathered by the projections from accompanying soil disposed in the lower portion of the drum and carried by the projections to the upper portion of the drum during rotation.

Preferably, means are provided for breaking up lumps of the soil in the drum during rotation as well as support means for selectively removably positioning the receptacle stationarily within the drum. Thus, mechanical means may be provided on the support means and extending operatively selectively outwardly therefrom and toward the drum interior surface for breaking up such lumps of soil in the drum during rotation. For instance, the mechanical means may include a plurality of aligned soil lump engaging probes arranged in the form of a selectively adjustably positionable comb disposed substantially conextensively, e.g. axially, along at least a portion of the adjacent interior surface of the drum.

The drive means for rotating the drum may be of any desired type, such as an electric motor, preferably one of infinitely variable speed, or any other source of motive power capable of rotating the drum at relatively slow selective speeds merely sufficient to achieve cascading of the soil in the lower portion of the drum and concomitant gravity release of the worms from the projections in the upper portion of the drum and in turn gravity deposition for collection thereof. The rotating is effected at such slow speeds that it is without significant centrifugal force influence on the soil or on the worms and which force might otherwise detract from the overall efficiency of the cascading, gathering, gravity release and gravity deposition features of the invention.

In this regard, the rotational speed of the drum or zone is generally selected so as to be just sufficient to cause the soil to be cascaded on itself without being carried by centrifugal force to the upper portion of the drum or zone, and at the same time just sufficient to enable the projections to gather the worms from the cascading soil and carry such worms to the upper portion of the drum for gravity release without adverse counter-gravity influence thereon by any such generated centrifugal force. As the artisan will appreciate, the speed selected will vary as conditions dictate, and the operator can determine the desired rate of rotation in the field by simple trial and error preliminary test adjustments.

The axis of rotation of the drum is preferably disposed at a slight angle to the true horizontal, e.g. so as to enhance passage of the soil along the drum the feed point to the discharge point more or less automatically during the cascading. Desirably, in this regard, the drum may be provided as a relatively hollow drum having an inlet opening at one end thereof and an outlet opening at the other end thereof, and a delivery chute may be conveniently disposed at the inlet opening for feeding into the drum the soil from which the worms are to be harvested or gently mechanically picked, separated and/or extracted. The axis of rotation of the drum is accordingly preferably disposed at a slight angle to the true horizontal in a downward direction from the inlet opening end to the outlet opening end.

For versatile use, especially in the field, the drum may be mounted for rotation on a traveling carriage or cart along with the drive means, to provide a transportable more or less self-contained arrangement adapted for connection to a power source for energizing the drive means. In this regard, the drum may be provided with an exterior peripheral seat at one end portion thereof and an interior drive shaft connected thereto at the other end portion thereof, while the carriage may be correspondingly provided with roller means arranged for rotatably receiving the exterior seat of the drum and with journal means arranged for rotatably receiving the drive shaft.

According to a further aspect of the invention, the worm harvesting method concomitantly comprises the step of subjecting soil from which worms are to be harvested to gentle or mild rotation at comparatively low speeds about a substantially horizontal axis in a peripherally confined rotating path which has a plurality of correspondingly rotating worm gathering projections operatively distributed in spaced apart relation peripherally thereon and which includes a lower path portion containing the soil and an upper path portion containing a gravity release zone, whereby to cascade the soil upon itself and gather worms therefrom by the projections in the lower path portion and carry such worms by the projections to the gravity release zone in the upper path portion during the rotation, and the further step of collecting the gathered worms by gravity deposition upon gravity release thereof from the projections at the gravity release zone.

Such soil cascading, gentle gathering and carrying of worms by the projections, and gravity release and deposition features are all effectively carried out at a relatively slow selective rotational speed which is generally insufficient to generate centrifugal force on the soil or worms or at least is insufficient to exert such a force to an extent having an adverse influence on such features.

As the artisan will appreciate, any lumps contained in the soil being treated are desirably broken up in the lower path portion during rotation via inherent vibratory forces present and/or by appropriate mechanical means to permit enhanced access of the worm gathering projections to the accompanying worms in the rotating path.

Referring to the drawing, and especially to FIG. 1, an embodiment is shown of a worm harvesting apparatus 1 according to the invention usable for carrying out the concomitant method. Apparatus 1 includes a, preferably axially elongated and hollow, cylindrical rotor to drum 2, having an inlet opening 3 at one end thereof and an outlet opening 4 at the other end thereof, as well as an interior surface or wall 5 provided with a plurality of substantially radially inwardly projecting worm gathering projections, e.g. in the form of fingers 6. Fingers 6 are operatively distributed, preferably in axially and circumferentially spaced apart relation, at least along a portion of and desirably essentially uninterruptedly throughout the available extent of the interior surface 5 of drum 2 so as to utilize more fully the effective rotating work surface area in the drum.

Optionally, the worm gathering fingers may be provided in the form of any other worm gathering projections 6 so long as gentle gathering, picking and like selective manipulation of the worms may be achieved as well as ready gravity release of the worms from the projections in due course of the rotation operation for gravity deposition and collection. In accordance with a preferred form, such projections may be provided as substantially radially extending pins, desirably straight and smooth in configuration and operational surface texture to enhance the gentle gathering and gravity release of the worms. Nevertheless, any other particular form may be provided for the projection so long as such gentle manipulation and gravity release features can be practicably carried out. For instance, nails or self-tapping screws may simply be inserted through appropriate perforations in the drum wall and then be secured in place by use of welding, screw-nut connections, etc. whereby to provide such projections 6 in fixed peripheral position.

A delivery chute 7 is advantageously operatively disposed at the inlet opening 3 for feeding, e.g. by gravity flow, into the drum 2 portions of soil 8 from which worms 9 are to be harvested. Also, the drum is preferably mounted for rotation about an axis 10 which is disposed at a slight angle or incline to the true horizontal, i.e. in a downward direction from the inlet opening 3 end to the outlet opening 4 end. This will enhance cascading flow of the soil through the drum and automatic discharge from the outlet opening 4 onto the ground or onto a delivery receptacle or the like (not shown) which may be provided thereat.

Even where the supply of soil to the drum via chute 7 is by manual as opposed to automatic feed, it will be appreciated that only one attendant need by employed generally for this purpose due to the simplicity of the required manipulations.

A preferably axially elongated and substantially upwardly facing worm collecting receptacle 11, e.g. in the form of a box, trough, tray or similar gravity receptive container, is conveniently operatively removably disposed in drum 2. This may be effected by merely positioning receptacle 11 in resting contact on appropriately provided structural support member 12 extending into the drum from the inlet opening 3.

Receptacle 11 when in operative position in the drum e.g. extending in intersecting relation to the vertical plane of the drum rotation axis 10, is advantageously radially inwardly spaced from the worm gathering fingers 6 sufficiently to permit unhindered drum rotation relative thereto and gravity deposition thereinto of worms gathered by the fingers from accompanying soil disposed in the lower horizontal half portion 13 of the drum and carried by the fingers to a gravity release zone 14 defined above the normal cascading level 15 of the soil and along the upper horizontal half portion 16 of the drum during rotation (cf. FIGS. 1 and 2). The gravity release zone correspondingly extends in intersecting relation to the vertical plane of the drum rotation axis 10.

Receptacle 11 may be safely replaced when filled by merely sliding the same outwardly on support member 12, e.g. using a pole or stick, and substituting a replacement therefor in the same manner (cf. FIGS. 1 and 4).

Mechanical probe means for breaking up lumps of soil in the drum during rotation are also preferably included in the assembly, e.g. in the form of an adjustably positionable comb 17. Position adjusting screws 18, 18, accommodated in corresponding slots 19, 19 (see FIG. 5) in the legs of the comb frame 20, are provided for mounting the comb 17 on support member 12 in a selective manner. Comb 17 is thus disposed in the drum, e.g. more or less adjacent the receptacle 11, and extends operatively selectively outwardly from support member 12, i.e. from the vicinity of the receptacle 11, in a direction toward the drum interior surface 5.

Comb 17 is maintained at a slight downward deflection angle to the remainder of the structure provided by slot containing frame 20 so as to enable the probes 21 of the comb to be arranged in sufficiently spaced adjustable relation to the projections 6 to permit in turn unhindered drum rotation relative thereto. In the same way, this downward angular deflection of the probes 21 of comb 17 in opposed relation to the preferred direction of drum rotation as shown by arrow A (see FIG. 2), with or without any corresponding angular relation between the horizontal comb and the slightly inclined drum axis, i.e. where such inclined axis is present, enhances the ability of such probes to break up lumps of soil in the drum during rotation and maintain more readily the cascading level of the soil desirably in the lower half portion of the drum.

By reason of the selective radial spacing between the probes 21 and projections 6 as well as preferably corresponding selective axial spacing therebetween, any worms gathered by the rotating projections will pass unhindered along the rotating path without being snagged or otherwise damaged by the stationary probes 21.

Understandably, in order to provide adequate working clearance between the stationary chute 7 and the closely adjacent mouth portion of drum 2 at inlet opening 3, the interior surface 5 is maintained free and clear of projections 6 in the immediate axial end area 22 circumferentially thereat. A smooth and safe transition is thereby provided between the lower end of chute 7 extending into the inlet opening 3 of the drum and the adjacent portion of interior surface 5 containing the projections 6. Generally, during drum rotation the worms are effectively separated by projections 6 from the cascading soil in the lower portion 13 of the drum and carried to gravity release zone 14 in the upper portion 16 more or less essentially free from such soil, so that the worms deposited in receptacle 11 are in concomitantly soil-clean or soil-separated condition. Should any soil portions find their way to gravity release zone 14 and be deposited with the worms in receptacle 11, obviously the degree of such soil entrainment will be accordingly minor and of no detriment to the overall operation.

Drum 2 is conveniently mounted on traveling carriage 23 which may be manually or otherwise guided to and from any particular site in the field where worm harvesting is to be carried out or elsewhere as the case may be. Carriage 23 is provided with freely swiveling caster type wheel assemblies 24 for ease in manual improvement thereof and is preferably sufficiently axially elongated to accommodate drum 2 in slightly inclined rotatably mounted relation thereon.

In this regard, drum 2 is advantageously provided with an exterior peripheral or circumferential seat 25 at the inlet opening 3 end portion thereof, and with an interior drive shaft 26 suitably connected thereto at the outlet opening 4 end portion thereof. Carriage 23 concomitantly is provided with spaced rollers 27, 27 (see FIG. 4) arranged appropriately at one end portion thereof for rotatably receiving the exterior seat 25 of drum 2 and also with journal assembly 28 arranged at the other end portion thereof the rotatably receiving the drive shaft 26.

Rollers 27, 27 and journal assembly 28 are appropriately arranged on the framework 23a and 23b of carriage 23 in aligned slightly inclined relation to the true horizontal to provide in turn the axis of rotation 10 of drum 2 so that it is disposed at a corresponding slight angle to the true horizontal, yet at the same time rollers 27, 27 and journal assembly 28 adequately take the dynamic load and thrust of the rotating drum thereat.

Drive shaft 26 is provided on its protruding free end with a fly wheel element 29 to enhance the rotational effect desired in the well known manner for greater uniformity and smoothness of operation, especially considering the dynamic forces exerted by the constantly cascading soil. Flywheel element 29 contains a belt-seating step 30 on the outer surface thereof to accommodate the drive belt 31 for operatively coupling drive shaft 26 with drive motor 32, e.g. an infinitely adjustable variable speed electric motor.

Motor 32 is mounted on a platform 33 so that it is both laterally offset to permit unhindered discharge of soil from outlet opening 4 as well as inclined at a corresponding slight angle to the true horizontal and thus in coaxial or parallel alignment with step 30, flywheel element 29, drive shaft 26, drum 2, rollers 27, 27 and journal assembly 28 for efficient rotational movement of the various parts. Motor 32 is provided with electrical conduit leads 34 for connection to any appropriate source of power (not shown) for energizing the arrangement under the control of the usual type variable speed on-off switch (not shown) appropriately provided within convenient reach of the operator.

Motor 32 operates to drive drum 2 at a slow rotational speed which is insufficient to cause centrifugal force to be exerted on the soil and worms to the extent that the soil would be carried to the gravity release zone 14 and/or the worms would not be gravity released from the projections 6.

Drive shaft 26 may be fixedly connected to the interior of drum 2 by an appropriate crosspiece 35 coaxially aligning drive shaft 26 within drum 2 and sufficient to accommodate the torque stresses generated as motor 32 drives the soil filled drum 2 via the flywheel element 29, drive shaft 26 and such crosspiece 35. A similar axial end area 36 to end area 22 may be provided free and clear of projections 6 in the vicinity of the attachment of crosspiece 35 to the interior surface 6 at the outlet opening 4 end portion of the drum so as to accommodate such crosspiece. Naturally, the axial position of crosspiece 35 will be such that receptacle 11 and the adjacent portion of support member 12 are sufficiently spaced therefrom to permit unhindered drum rotation thereat.

As an added safety feature, the drum and other rotating parts may be enclosed optionally in a protective cage (not shown) in the well known manner as the artisan will appreciate, merely leaving sufficient access to permit soil to be fed to chute 7 and discharged from the lower portion of outlet opening 4 as appropriate. Also, a trap door in the cage (not shown) may be provided adjacent support member 12 to permit access to receptacle 11 for retrieval and reinsertion, preferably during a short rotation operation interruption for this purpose as a further safety measure as regards the attendant.

Accordingly, the apparatus described may be advantageously used to carry out the concomitant worm harvesting method of the invention under conditions normally requiring the attendance of only one person. Specifically, soil from which worms are to be harvested, gethered, picked, extracted or collected for recovery therefrom may be subjected to gentle rotation at non-centrifugal force generating slow speeds about a substantially horizontal, e.g. preferably slightly inclined, axis in a peripherally confined rotating path or drum which has a plurality of correspondingly rotating worm gathering projections, e.g. fingers or pins, operatively distributed in spaced apart relation peripherally thereon and which includes a lower horizontal half path portion containing the soil and an upper horizontal half path portion containing a gravity release zone, whereby to cascade gently the soil upon itself and gather gently worms therefrom by the projections in the lower horizontal half path portion and in turn carry gently such worms by the projections to the gravity release zone in the upper horizontal half path portion during rotation. The gathered worms may be in turn gently collected by gravity deposition upon gravity release thereof from the projections at the gravity release zone.

As the artisan will appreciate, the worm collecting receptacle is appropriately disposed at a level below the gravity release zone of the rotating projections in the upper horizontal half path portion of the drum which is insufficient in distance therefrom to cause damage to the dropping worms as they are deposited by gravity in such receptacle. This distance is selectively limited inherently by the dimensions of the drum system and particularly by the confining diameter of the drum, considering the radial dimensions of the projections, the size of the receptacle and the need to maintain the receptacle and projections in spaced relation within the drum so as to insure unhindered rotation of the drum. A further factor limiting such distance collaterally is the need to accommodate the soil lump breaking comb along the axial side of the receptacle, i.e. mounted on the support member, and to provide such receptacle and its support member at a level sufficiently above the normal level of the cascading soil to avoid interference therewith.

Naturally, the support member will be sufficiently strong to withstand not only the static forces of the weight of the receptacle removably stationarily resting thereon and its accumulating deposited worm contents but also the dynamic forces of any lumps of soil urged under rotating albeit cascading movement against the probes of the comb adjustably yet fixedly stationarily connected thereto via the comb frame. Such mechanical lump breaking action of the comb frame and comb probes may take advantage of any inherent resilient or spring metal qualities of the structural material used therefor so as to provide an appropriate amount of give and take, and especially inherent spring return to overcome resistance which may be presented thereto by relatively harder, more dense or larger lumps which may be present in the soil.

Of course, while it is preferred that the projections be provided in more or less uninterrupted axial end circumferential array along and around the interior surface of the drum for the desired purposes, selective continuous and discontinuous areas of such projections may be provided axially and/or circumferentially along and around the interior surface of the drum, as the artisan will appreciate, although the thoroughness and uniformity of the worm gathering and collecting effect may diminish accordingly in concomitant manner. Also, while it is preferred that the projections be of the same general radial length, projections of different radial lengths may also be used as well as projections of different widths in axial and/or circumferential relative directions as the case may be.

In the same way, although the use of a cylindrical drum appears to be most desirable from a cost and efficiency point of view, it will be realized that a drum having a different configuration may also be used such as one of slightly out of round or oval cross-sectional hollow shape, frusto-conical shape, etc., so long as the desired gentle soil-cascading, worm-gethering, worm-carrying, gravity release and gravity deposition features are not significantly adversely affected.

While the use of a slightly inclined axis of rotation for the drum is preferred to achieve more or less continuous or automatic feed to the drum, cascading passage through the drum, and discharge from the drum, of the soil being treated, nevertheless, of course, such axis of rotation may also be used effectively in true horizontal disposition or orientation. As regards the latter, the nature and downwardly inclined feed angle of the chute at the inlet opening of the drum and the dynamics of cascading rotation of the soil in the drum, even though carried out about a true horizontal axis, will be generally sufficient alone to achieve effective throughput rates and volumes of soil and in turn random discharge of the treated soil from the drum in more or less flowable mechanically broken up condition.

In the same way, as the artisan will appreciate, the drum may be used for both batch as well as continuous operation consonant with appropriate feeding of soil via the delivery chute thereto, with the receptacle periodically being emptied or replaced by the attendant in either case as conditions require.

Thus, the present invention provides an apparatus and method for harvesting worms which by their very nature, and especially the attendant features of dynamic cascading rotation and gentle projection gathering and gravity release of worms, enable both high and low orders of magnitude tonnage and volume soil levels to be processed in a versatile manner in a given size drum unit or system. As is readily apparent, the apparatus and method both enjoy simplicity, efficiency and economy. Specifically, the apparatus is strong and safe in design, simple and inexpensive in construction, durable and efficient in use, and requires a minimum of motive power and a minimum of attention by the operator. The worms are generally separated and collected more or less substantially free from the attendant soil in a manner assuring effective safety both to the operator and the worms, and normally enabling a single attendant or operator to carry out the soil feeding and worm retrieving operation for gentle gathering and collecting of the worms essentially without damaging or killing the worms.

It will be realized that the foregoing specification and drawings have been set forth by way of illustration and not limitation, and that various modifications and changes may be made therein without departing from the spirit and scope of the present invention, which is to be limited solely by the scope of the appended claims.

What is claimed is:

1. Worm harvesting method which comprises subjecting soil from which worms are to be harvested to rotation about a substantially horizontal axis in a peripherally confined rotating path which has a plurality of correspondingly rotating and inwardly projecting worm gathering projections operatively distributed in spaced apart relation thereon and which includes a lower path portion containing the soil and an upper path portion containing a gravity release zone extending in intersecting relation to the vertical plane of such horizontal axis, cascading the soil upon itself and gathering worms therefrom by the projections in the lower path portion and carrying such worms by the projections to the gravity release zone in the upper path portion during the rotation, and collecting the gathered worms by depositing such worms by gravity upon gravity release thereof from the projections at the gravity release zone.

2. Method according to claim 1 wherein the soil contains lumps and further comprising the step of breaking up the lumps in the lower path portion during rotation to permit enhanced access of the worm gathering projections to the accompanying worms.

3. Worm harvesting method which comprises rotating soil from which worms are to be harvested in a drum mounted for rotation about a substantially horizontal axis and having an interior surface provided with a plurality of worm gathering projections operatively distributed in spaced apart relation thereon, said drum including a lower portion containing the soil and an upper portion containing a gravity release zone, cascading the soil upon itself and gathering worms therefrom by the projections in the lower portion and carrying such worms by the projections to the gravity release zone in the upper portion during rotation, and collecting the gathered worms by depositing such worms by gravity upon gravity release thereof from the projections at the gravity release zone in a worm collecting receptacle operatively disposed within the drum and extending in intersecting relation to the vertical plane of such horizontal axis and radially inwardly spaced from the worm gathering projections sufficiently to permit unhindered drum rotation relative thereto and such depositing by gravity thereto.

4. Worm harvesting apparatus which comprises a drum mounted for rotation about a substantially horizontal axis and having an interior surface provided with a plurality of worm gathering projections operatively distributed in spaced apart relation thereon, a worm collecting receptacle operatively disposed in the drum and extending in intersecting relation to the vertical plane of such horizontal axis and radially inwardly spaced from the worm gathering projections sufficiently to permit unhindered drum rotation relative thereto and gravity deposition thereinto of worms gathered by the projections from accompanying soil disposed in the lower portion of the drum and carried by the projections to the upper portion of the drum during rotation, and means for breaking up lumps of soil in the drum during rotation.

5. Apparatus according to claim 4 wherein drive means are provided for rotating the drum.

6. Apparatus according to claim 4 wherein the axis of rotation of the drum is disposed at a slight angle to the true horizontal.

7. Apparatus according to claim 4 wherein support means are provided for selectively removably positioning the receptacle within the drum.

8. Apparatus according to claim 7 wherein the means for breaking up lumps of soil include mechanical means provided on the support means and extending operatively selectively outwardly therefrom and toward the drum interior surface whereby to break up lumps of soil in the drum during rotation.

9. Apparatus according to claim 4 wherein the drum is a hollow drum having an inlet opening at one end thereof and an outlet opening at the other end thereof, and a delivery chute is operatively disposed at the inlet opening for feeding into the drum soil from which worms are to be harvested.

10. Apparatus according to claim 9 wherein the axis of rotation of the drum is disposed at a slight angle to the true horizontal in a downward direction from the inlet opening end to the outlet opening end.

11. Apparatus according to claim 4 wherein the drum is provided with an exterior peripheral seat at one end portion thereof and an interior drive shaft connected thereto at the other end portion thereof, and the drum is mounted for rotation on a traveling carriage which is provided with roller means arranged for rotatably receiving the exterior seat of the drum and journal means arranged for rotatably receiving the drive shaft.

12. Apparatus according to claim 11 wherein the drive shaft is provided with a flywheel and drive means are provided on the carriage in operatively coupling relation with the drive shaft for rotating the drum.

13. Worm harvesting apparatus which comprises an axially elongated hollow drum having an inlet opening at one end thereof, an outlet opening at the other end thereof and an interior surface provided with a plurality of substantially radially inwardly projecting worm gathering fingers operatively distributed in axially and circumferentially spaced apart relation thereon, means for mounting the drum for rotation about an axis disposed at a slight angle to the true horizontal in a downward direction from the inlet opening end to the outlet opening end, drive means for rotating the drum, a delivery chute operatively disposed at the inlet opening for feeding into the drum soil from which worms are to be harvested, an axially elongated substantially upwardly facing worm collecting receptacle operatively removably disposed in the drum and extending in intersecting relation to the vertical plane of said axis and radially inwardly spaced from the worm gathering fingers sufficiently to permit unhindered drum rotation relative thereto and gravity deposition thereinto of worms gathered by the fingers from accompanying soil disposed in the lower half portion of the drum and carried by the fingers to a gravity release zone defined above the level of the soil and along the upper half portion of the drum during rotation, and mechanical probe means disposed in the drum adjacent the receptacle and extending operatively selectively outwardly from the vicinity of the receptacle in a direction toward the drum interior surface and arranged in sufficiently spaced relation to the worm gathering fingers to permit unhindered drum rotation relative thereto for breaking up lumps of soil in the drum during rotation.

14. Apparatus according to claim 13 wherein the worm gathering fingers are in the form of substantially radially extending pins.

15. Apparatus according to claim 13 wherein the drum is provided with an exterior peripheral seat at one end portion thereof and with an interior drive shaft connected thereto at the other end portion thereof and operatively carrying a flywheel, and the drum is mounted for rotation on an axially elongated traveling carriage which is provided with roller means arranged at one end portion thereof for rotatably receiving the exterior seat of the drum and journal means arranged at the other end portion thereof for rotatably receiving the drive shaft and on which the drive means is mounted in operatively coupling relation with the drive shaft.

16. Worm harvesting apparatus which comprises a drum mounted for rotation about a substantially horizontal axis and having an interior surface provided with a plurality of worm gathering projections operatively distributed in spaced apart relation thereon, a worm collecting receptacle operatively disposed in the drum and radially inwardly spaced from the worm gathering projections sufficiently to permit unhindered drum rotation relative thereto and gravity deposition thereinto of worms gathered by the projections from accompanying soil disposed in the lower portion of the drum and carried by the projections to the upper portion of the drum during rotation, support means for selectively removably positioning the receptacle within the drum, and mechanical means on the support means and extending operatively selectively outwardly therefrom and toward the drum interior surface for breaking up lumps of soil in the drum during rotation, the mechanical means including a plurality of aligned soil lump engaging probes arranged in the form of a selectively adjustable positionable comb disposed substantially coextensively along at least a portion of the adjacent interior surface of the drum.

* * * * *